United States Patent Office 3,079,265
Patented Feb. 26, 1963

3,079,265
PORCELAIN ENAMEL SLIP AND METHOD FOR PREPARING THE SAME
Dean S. Hubbell, Connersville, Ind., and Ernest P. Weaver, Pittsburgh, Pa., assignors to H. H. Robertson Company, Pittsburgh, Pa., a corporation of Pennsylvania
No Drawing. Original application Feb. 28, 1958, Ser. No. 718,176, now Patent No. 2,932,584, dated Apr. 12, 1960. Divided and this application Sept. 22, 1959, Ser. No. 841,454
6 Claims. (Cl. 106—49)

The present invention relates to porcelain enamel slip and a method for preparing the same. More particularly the invention is concerned with a porcelain enamel slip having increased storage life.

This invention is especially concerned with the so-called "low temperature enameling", i.e., those which mature at temperatures below about 1050° F.

The present invention is a division of our copending application S.N. 718,176, filed February 28, 1958, now U.S. Patent 2,932,584, which in turn is a continuation-in-part of our copending application S.N. 542,238, filed October 24, 1955, which in turn is a continuation-in-part of an earlier filed application, now abandoned, S.N. 500,988, filed April 12, 1955.

In the porcelain enameling of metal surfaces, a suitably treated metal surface is coated with an aqueous slurry of glass frit to a uniform thickness. The aqueous slurry of comminuted glass frit is termed an "enamel slip." The slip usually contains from about 4.5 to 5.5 gallons of water for each 100 pounds of frit. The metal surface, coated with slip, is dried to leave behind a residue of uniform thickness called a "bisque" which consists of the solid particles which had been suspended in the slip. The metal article, thus coated, is heated to a temperature sufficient to melt the frit or glassy portion of the bisque and cause it to coalesce into a continuous film or coating of glass on the metal surface. Usually opacifiers such as titanium dioxide, antimony oxide and similar metal oxides are added to the porcelain enamel slip to contribute opacity to the slip and the coating. Usually, so-called "color oxides" are included in the porcelain enamel slip to create the desired color in the resulting enamel coating. The color oxides are colored, opaque, refractory materials such as cobalt oxide, for example, when blue coloring is desired. Normally certain buffering reagents such as boric acid, potassium silicate, potassium hydroxide and the like are added to the porcelain enamel slip to offset the gradually increasing pH of the slip during storage.

The porcelain enamel slips in the past have exhibited very poor storage properties. On standing for a matter of a week or so (and occasionally only for a few days) they become lumpy and finally harden into a solid mass. Accordingly it is the practice in the enameling industry to prepare porcelain enameling slips for use in the near-term future. Color reproduction and color matching often becomes a trial-and-error problem in preparing porcelain enameling slips for reproducing previous production.

The object of the present invention is to prepare a porcelain enamel slip which has increased storage life. A further object of the invention is to provide a porcelain enamel slip which includes a small quantity of finely divided metallic copper particles which do not interfere with the formation of vitreous coatings from the slip yet increase the storage life of the slip.

According to the present invention we have discovered that the presence of 0.01 to 0.2 percent by weight (based on the weight of the frit) of finely divided particles of crystalline copper powder in a porcelain enamel slip serves to increase the storage life of the slip without adversely affecting the properties of the resulting vitreous coatings. The crystalline copper powder must be friable and not ductile. Preferably the crystalline copper powder is added to a batch of glass particles before they are milled into frits so that the copper particles will be interground with the other constituents of the slip. Preferably the copper powder is added in the form of finely divided particles having a diameter less than about 100 microns. Copper powder in this form can be prepared as described in U.S. Patent 2,420,540, issued May 13, 1947, to D. S. Hubbell, one of the present inventors, and assigned to the assignee of the present invention. Such copper powders have been prepared having a mean particle diameter less than about 5 microns.

EXAMPLE I

Two mill batches (one gallon each) of porcelain enamel slip were prepared simultaneously. Each employed the same standard slip formulation.

*Standard Slip Formulation*

10 pounds frit (prepared according to process of U.S. Patent 2,467,114, Deyrup)
3.37 ounces boric acid
6.75 ounces potassium silicate
4.0 ounces potassium hydroxide
1.0 pound titanium dioxide (TXA grade for matte)
8.0 ounces titanium dioxide (RA–10 grade for opacifying)
4.0 ounces cobalt compounds (for blue coloring)
5.0 pounds water One mill batch (A) contained 1.4 grams of cupreous powder as described in the aforementioned U.S. Patent 2,420,540. There were no additions to the second mill batch (B). Both batches were ground until a sample of 100 grams left no more than 0.2 gram residue on a 325-mesh U.S. standard screen.

The slip without interground copper became hardened and could not be used after 2½ to 3 weeks. The slip containing the copper, after 11 months storage, could be easily stirred with a spoon to a sprayable consistency and produced a satisfactory porcelain enamel.

Frits, according to the aforesaid Deyrup Patent 2,467,114, contain as essential ingredients, lead oxide, silica, lithium oxide, and at least one other alkali metal oxide taken from the group consisting of sodium oxide and potassium oxide, a portion of the silica being replaceable with titanium oxide. The frit also may contain a small amount of antimony oxide.

These ingredients, according to the Deyrup patent, must be present in accordance with the following ranges and relative proportions:

| | Mole percent |
|---|---|
| Lead oxide (PbO) | 10 to 18 |
| Silica ($SiO_2$) | 38 to 65 |
| Lithium oxide ($Li_2O$) | 5 to 12 |
| Sodium oxide ($Na_2O$) | 0 to 22 |
| Potassium oxide ($K_2O$) | 0 to 20 |
| Titanium oxide ($TiO_2$) | 0 to 11 |

The total alkali metal oxide content

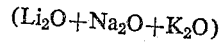

must be between 25 and 36 mole percent and the ratio of the silica content, or the silica content plus twice the titanium content of the composition in mole percent to the total alkali metal oxide content in mole percent must be between 1.8 and 3.0, i.e.,

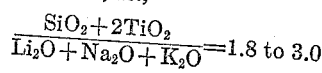

EXAMPLE II

A batch of porcelain enamel slip was prepared by admixing and milling the following ingredients:

100 pounds frit (according to U.S. Patent 2,467,114),
3.25 pounds boric acid,
6.50 pounds potassium silicate,
2.5 pounds potassium hydroxide,
13.5 pounds titanium dioxide (TXA grade, matte),
2.5 pounds titanium dioxide (RA-10 grade, opacity),
0.5 pound antimony trioxide,
25 ounces color oxides (cobalt compounds), and
14 grams cupreous powder (prepared according to U.S. Patent 2,420,540)
5 gallons water The batch was milled until no more than 0.2 gram out of a 100-gram sample was retained on a 325-mesh U.S. standard screen. The resulting porcelain enamel slip was stored at room temperature. The slip remained suitable for immediate use after eleven months of storage. The copper content was 0.03 percent by weight of the frit.

EXAMPLE III

Three mill batches (one-gallon each) of porcelain enamel slip were prepared from the formulation listed in Example I. To the first mill batch (C) no copper was added. To the second mill batch (D), 0.02 percent by weight of copper powder was added. To the third mill batch (E) 0.25 percent by weight of copper powder was added.

All three batches were milled until no more than 0.2 gram of residue was retained from a 100-gram sample on a 325-mesh U.S. standard screen.

At the end of nine months, specimen (C) was completely hardened. In fact, hardening was exhibited within one month of storage.

Specimen (D) was observed to be fluid after a period of nine months. After 27 months storage, specimen (D) could be stirred, with some effort, into a smooth slip which produced a satisfactory porcelain enamel.

Specimen (E) remained fluid for several months but was becoming hard at the end of six months. Thus it appears, from specimen (E), that it is possible to intergrind an excessive amount of copper powder which will prevent the desired storage life extension.

Accordingly we prefer to add from 0.01 to 0.20 percent by weight (based on the weight of frit) of copper powder into the mill charge prior to comminution into frit.

The preferred method for introducing the copper powder is to combine the finely divided copper powder with the other ingredients of the frit prior to their comminution. By this technique the copper powder will be interground with the other ingredients. Normally the mill charges are comminuted by ball milling or rod milling to a consistency such that more than 98.2 percent will pass through a 325-mesh U.S. standard screen. By adding the friable, crystalline, copper powder, preferably having a mean particle diameter less than about five microns prior to milling, the copper particles are further reduced in size and intimately interground with the other ingredients.

According to the provisions of the patent statutes, we have explained the principle, preferred construction and mode of operation of our invention and have illustrated and described what we now consider to represent its best embodiment. However, we desire to have it understood that within the scope of the appended claims, the invention may be practiced otherwise than as specifically illustrated and described.

We claim:

1. An enamel slip comprising an aqueous slurry of finely divided glass frit and containing 0.01 to 0.20 percent by weight of finely divided crystalline copper particles, said slip having a greater storage life than an aqueous slurry of the said glass frit which contains no crystalline copper particles.

2. The enamel slip of claim 1 containing a metallic oxide opacifier.

3. The enamel slip of claim 1 wherein said copper particles have a mean diameter less than about 5 microns.

4. The enamel slip of claim 2 containing a pH buffering reagent.

5. In an enamel slip comprising an aqueous slurry of finely divided glass frit which comprises lead oxide, silica, lithium oxide and oxides selected from the group consisting of oxides of sodium, potassium and titanium, the improvement comprising a quantity of finely divided crystalline copper particles in said slip in an amount from 0.01 to 0.20 percent by weight of the said slip, whereby the resulting slip has a greater storage life than an aqueous slurry of the said glass frit which contains no crystalline copper particles.

6. The method of preparing an enamel slip having increased storage life comprising admixing glass particles which comprise lead oxide, lithium oxide and oxides selected from the glass consisting of oxides of sodium, potassium and titanium, together with 0.01 to 0.20 percent by weight of finely divided crystalline copper powder having a mean diameter less than about 5 microns, comminuting the said admixture until the said glass particles are reduced to frit, and admixing the comminuted admixture with sufficient water to form an aqueous slurry suitable as an enamel slip, whereby the resulting enamel slip has a greater storage life than an aqueous slurry of the said glass particles in comminuted form which contains no crystalline copper particles.

References Cited in the file of this patent

UNITED STATES PATENTS 1,693,825   Stoekle ---------------- Dec. 4, 1928